UNITED STATES PATENT OFFICE.

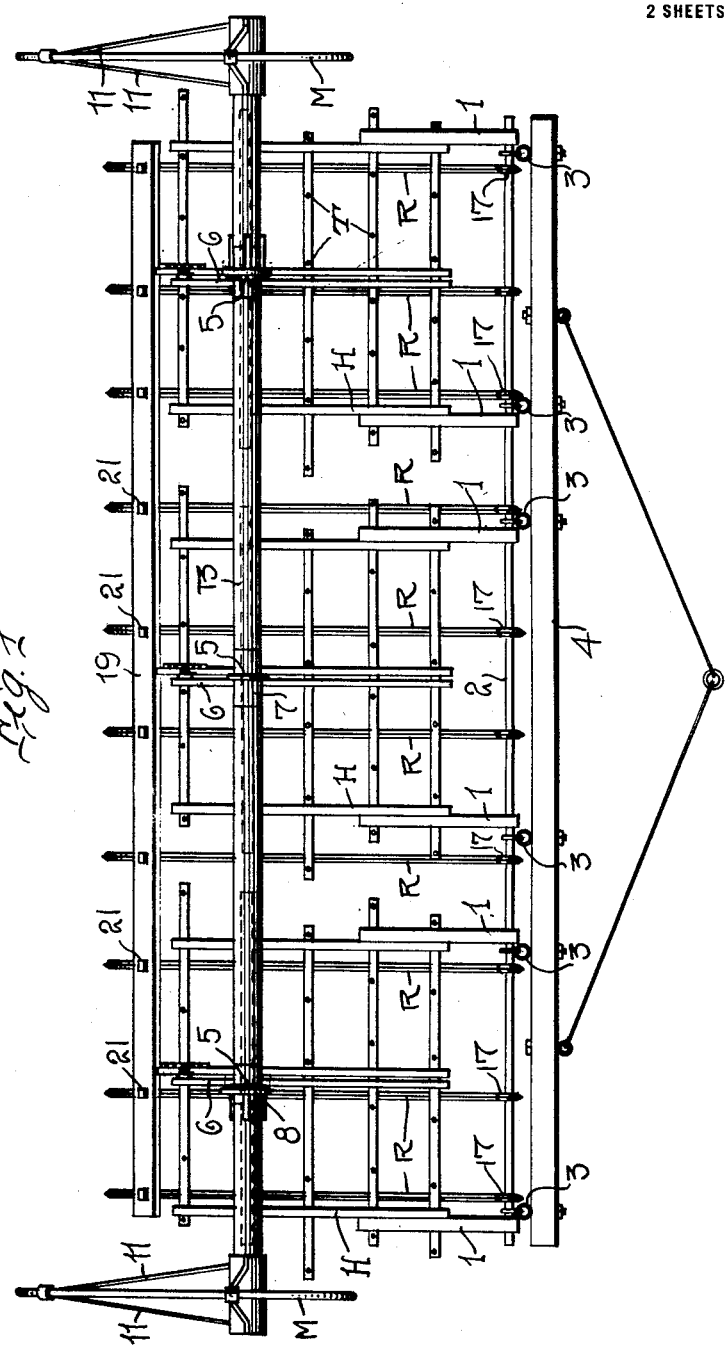

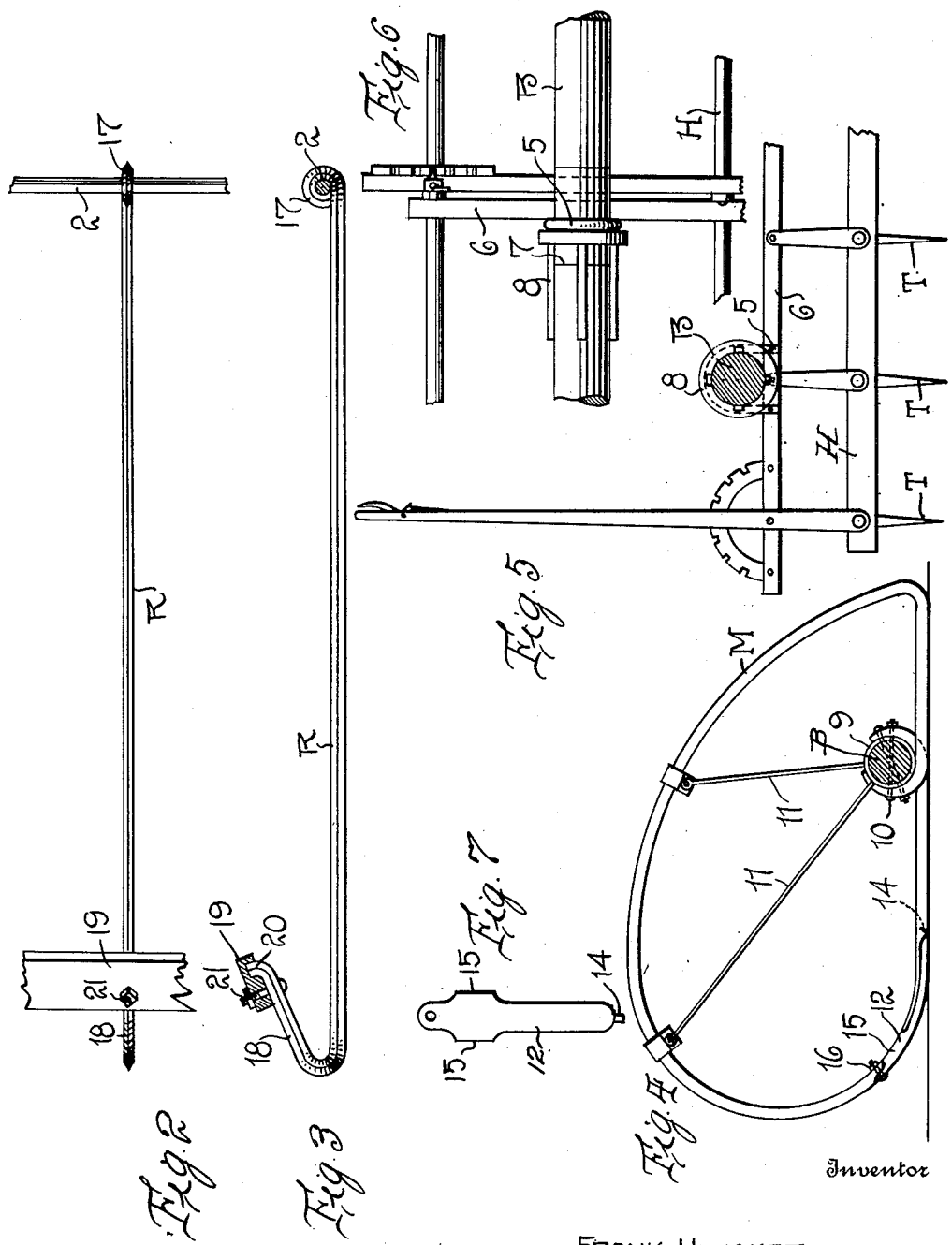

FRANK HUNCKER, OF RIVERTON, WYOMING.

HARROW.

1,198,846.  Specification of Letters Patent.  Patented Sept. 19, 1916.

Application filed March 25, 1916. Serial No. 86,713.

*To all whom it may concern:*

Be it known that I, FRANK HUNCKER, a citizen of the United States, residing at Riverton, in the county of Fremont and State of Wyoming, have invented certain new and useful Improvements in Harrows, of which the following is a specification, reference being had to the accompanying drawings.

This invention relates to certain improvements in harrows and it is an object of the invention to provide a device of this general character having novel and improved means whereby the device serves as an effectual medium for collecting debris and foreign matter which must be removed from the soil being prepared for seed bed.

It is also an object of the invention to provide a harrow with novel and improved means whereby the same may be readily elevated when desired and whereby an effective means is employed for stripping the harrow teeth of any foreign matter such as brush which may have a tendency to adhere thereto.

The invention consists in the details of construction and in the combination and arrangement of the several parts of my improved harrow whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in top plan of a harrow constructed in accordance with an embodiment of my invention; Fig. 2 is a fragmentary view in top plan illustrating a cleaning bar as herein included; Fig. 3 is a view in side elevation of the structure shown in Fig. 2; Fig. 4 is a view partly in elevation and partly in section illustrating one of the lifting members as herein disclosed; Fig. 5 is a view partly in side elevation and partly in section illustrating certain details of construction of my invention as herein embodied; Fig. 6 is a view in top plan of the structure shown in Fig. 5; and Fig. 7 is a detail view in plan of the guard shoe herein employed.

As disclosed in the accompanying drawings, H denotes a plurality of harrow sections of ordinary or preferred construction, and the forward end portions of the side bars of each of the sections H are provided with the extensions 1 pivotally engaged with the rod 2 and operatively connected, as at 3, with the hitch bar 4, said rod 2 being arranged inwardly of the hitch bar 4 and arranged substantially in parallelism therewith.

Arranged above the harrow sections H is the elongated beam B which extends through the yokes 5 extending upwardly from the center rails 6 of the harrow sections H, the portions of the beam B extending through the yokes 5 being provided with the metallic sleeve or ferrule 7 to protect the beam against wearing, as is believed to be clearly apparent to those skilled in the art to which my invention appertains.

Suitably affixed to the beam B are the collars 8 coacting with the end yokes 5 in order to hold the beam B against end thrust.

The beam B is of such a length as to extend beyond the opposite ends of the harrow and fixed to the extended end portions of the beam B is a metallic thimble or hub 9 of the lifting members M.

As herein disclosed, the members M are of duplicate construction and each of said members is formed preferably of a tubular rim having one portion substantially straight and having its opposite portion disposed to afford a cam of predetermined pitch, and the extremities of the rim are secured directly to the thimble 9, as indicated at 10, and the intermediate portions of the rim are reinforced or braced by the spoke members 11.

As herein disclosed, the harrow is of a drag type and when the same is being used to pulverize the soil, the straight portions of the members M overlie the surface whereby it will be perceived that no hindrance will be offered to the operation of the harrow, and as said straight portion, owing to the configuration of the member, will have its rear end portion dragging upon the surface, I deem it advisable to provide the rear end of the straight portion of the member with the shoe 12 which comprises an elongated member of predetermined curvature in cross section and having its inner end provided with the lip or extension 14 adapted to extend within an opening in the rim, while the opposite end portion of the shoe 12 is provided with the laterally directed ears 15 adapted to embrace the rim, and disposed through the rim and the end portion of the shoe 12 remote from the extension or lip 14 is a conventional clamping member 16 herein disclosed as a conventional bolt and nut.

My device as herein disclosed is primarily adapted for use in the sage country and in addition to pulverizing the soil, the harrow sections H serve to collect the sage or other foreign substances and at predetermined intervals it is only necessary for the operator to turn the beam B through the medium of one of the members M until the forward ends of the members are brought in contact with the ground, whereby said members will be caused to rotate upon the further advance of the harrow and result in the harrow sections H being lifted a distance sufficient to bunch the sage or other matter collected thereby.

Coacting with the teeth T of the harrow sections H are the cleaning rods R which are preferably diamond-shaped in cross section in order to prevent the lodgment of the teeth T thereon. The forward extremity of each of the rods R is returned to afford an eye 17 through which the rod 2 is loosely directed, and the rear end of the rod R is upwardly and forwardly directed on a predetermined incline, as indicated at 18, and secured to the beam 19 of sufficient weight to assure the rear ends of the rods riding upon the surface during the time the harrow sections H are elevated, whereby it will be perceived that all of the refuse is removed from the teeth T.

As herein embodied, the upper or free extremities of the returned portion 18 are bent to afford the upwardly extending lug 20 extending within the under surface of the beam 19, and disposed through the portion 18 and the beam 19 is the clamping member 21 herein disclosed as a conventional bolt and nut. By this arrangement it will be perceived that the rear end of the rod R is effectively secured to the beam 19.

From the foregoing description, it is thought to be obvious that a harrow constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A drag harrow comprising a hitch bar, a harrow section pivotally engaged with said hitch bar and movable in a vertical direction, a beam disposed above the harrow section, an operative connection between the beam and the harrow section, and eccentric lifting members secured to the beam at opposite sides of the harrow section.

2. A drag harrow comprising a hitch bar, a harrow section pivotally engaged with said hitch bar and movable in a vertical direction, a beam disposed above the harrow section, an operative connection between the beam and the harrow section, and eccentric lifting members secured to the beam at opposite sides of the harrow section, each of said lifting members being provided with a straight portion to permit the harrow section to normally engage a surface to be treated.

3. A drag harrow comprising a hitch bar, a harrow section pivotally engaged with said hitch bar and movable in a vertical direction, a beam disposed above the harrow section, an operative connection between the beam and the harrow section, eccentric lifting members secured to the beam at opposite sides of the harrow section, and a cleaning member for the harrow pivotally supported by the hitch bar and having its rear portion weighted whereby said rear portion is constantly maintained in contact with the surface upon which the harrow rests when in operation.

4. A harrow comprising, in combination, a hitch bar, a harrow section pivotally engaged therewith and movable in a vertical direction, an upstanding yoke carried by the section, a beam disposed above the section and loosely directed through the yoke, and eccentric lifting members carried by the beam at opposite sides of the section.

5. A harrow comprising, in combination, a hitch bar, a harrow section pivotally engaged therewith and movable in a vertical direction, an upstanding yoke carried by the section, a beam disposed above the section and loosely directed through the yoke, eccentric lifting members carried by the beam at opposite sides of the section, and means for holding the beam against end thrust.

In testimony whereof I hereunto affix my signature in the presence of two witnesses.

FRANK HUNCKER.

Witnesses:
 GEORGE F. DOBLER,
 I. D. WOODWARD.